United States Patent
Bragg

(10) Patent No.: US 10,921,831 B2
(45) Date of Patent: Feb. 16, 2021

(54) SMART GAS PRESSURE REGULATOR WITH ENERGY HARVESTING

(71) Applicant: Honeywell International Inc., Morris Plains, NJ (US)

(72) Inventor: Martin Bragg, Carlisle (GB)

(73) Assignee: Honeywell International Inc., Morris Plains, NJ (US)

( * ) Notice: Subject to any disclaimer, the term of this patent is extended or adjusted under 35 U.S.C. 154(b) by 302 days.

(21) Appl. No.: 15/938,851

(22) Filed: Mar. 28, 2018

(65) Prior Publication Data

US 2019/0302811 A1    Oct. 3, 2019

(51) Int. Cl.
| | |
|---|---|
| G05D 16/02 | (2006.01) |
| G05B 15/02 | (2006.01) |
| G05D 23/19 | (2006.01) |
| G05D 16/20 | (2006.01) |

(52) U.S. Cl.
CPC ............. *G05D 16/02* (2013.01); *G05B 15/02* (2013.01); *G05D 16/2086* (2013.01); *G05D 16/2093* (2013.01); *G05D 23/1904* (2013.01)

(58) Field of Classification Search
CPC ............... G05D 16/02; G05D 16/2086; G05D 16/2096; G05D 23/1904; G05B 15/02
See application file for complete search history.

(56) References Cited

U.S. PATENT DOCUMENTS

| | | | | |
|---|---|---|---|---|
| 6,035,878 A | * | 3/2000 | Adams | ............... G05D 16/2095 137/1 |
| 2013/0030577 A1 | | 1/2013 | Jarrell et al. | |
| 2016/0356665 A1 | | 12/2016 | Felemban et al. | |

OTHER PUBLICATIONS

Amini et al., A Practical Solution to the Problem of Noise and Vibration in a Pressure-Reducing Valve, 1995, Experimental Thermal and Fluid Science 10, pp. 136-141 (Year: 1995).*
PMG Perpetuum, "Vibration Energy Harvesters," VEH Technical Datasheet, Oct. 2013, 6 pages.
Zafer et al., "Stability of gas pressure regulators," Applied Mathematical Modeling 32, May 2005-Jan. 2007, pp. 61-82.
Extended European Search Report dated Aug. 16, 2019 for corresponding EP Application No. 19165046.4.
Jiao et.al., A Gas Regulator fault detecting method based on acoustic emission technology, Oct. 27, 2017 (Oct. 27, 2017), pp. 91-94, XP033347779.
Havskov, J. et al., "Instrumentation in Earthquake Seismology," Modern Approaches in Geophysics book series (MAGE), 2004, 4 pages, vol. 22, Springer, Dordrecht, Netherlands.

\* cited by examiner

*Primary Examiner* — Toan M Le
(74) *Attorney, Agent, or Firm* — Jetter & Associates, P.A.

(57) ABSTRACT

An electronic device and a method are disclosed. The electronic device includes a sensor, a memory, a processor, and a communication interface. The sensor is configured to detected vibrations of a gas pressure regulator. The memory is configured to store the detected vibrations. The processor is configured to record the detected vibrations caused by the gas pressure regulator at a predetermined time interval. The processor is also configured to generate a report of the recorded vibrations caused by the gas pressure regulator to indicate the operational status of the gas pressure regulator, wherein the generated report includes at least two recorded vibrations. The communication interface configured to transmit the generated report.

18 Claims, 3 Drawing Sheets

SMART GAS PRESSURE REGULATOR WITH ENERGY HARVESTING

TECHNICAL FIELD

This disclosure relates generally to industrial process control and automation systems. More specifically, this disclosure relates to an apparatus and method to generate energy from vibrations of a gas pressure regulator and analyzing various parameters to indicate the operational status of the gas pressure regulator.

BACKGROUND

Industrial process control and automation systems are often used to automate large and complex industrial processes. These types of systems routinely include sensors, actuators, and controllers. The controllers are often arranged hierarchically in a control and automation system. For example, lower-level controllers are often used to receive measurements from the sensors and perform process control operations to generate control signals for the actuators. Higher-level controllers are often used to perform higher-level functions, such as planning, scheduling, and optimization operations. Human operators routinely interact with controllers and other devices in a control and automation system, such as to review warnings, alarms, or other notifications and make adjustments to control or other operations. Various sensors and valves provide control to the automation system, and when a valve or sensor fails various issues can occur to the automation system.

Gas regulators are devices commonly used in industrial processes and maintain a constant output pressure regardless of variations from the input pressure. Generally, a gas regulator provides for high pressure gas to flows into an orifice, the gas pressure is reduced or stabilized and a regulated lower pressure gas exits. Such devices do not require electricity to regulate gas pressure.

SUMMARY

This disclosure provides an apparatus and method for automatic contextualization and issue resolution related to an industrial process control and automation system.

In a first embodiment, an electronic device includes a sensor, an information repository a processor and a communication interface. The sensor configured to detected vibrations of a gas pressure regulator. The information repository configured to store the detected vibrations. The processor is configured to record the detected vibrations caused by the gas pressure regulator at a predetermined time intervals. The processor is also configured to generate a report of the recorded vibrations caused by the gas pressure regulator to indicate the operational status of the gas pressure regulator, wherein the generated report includes at least two recorded vibrations. The communication interface configured to transmit the generated report.

In a second embodiment, an electronic device includes a communication interface and a processor. The communication interface is configured to receive a report and transmit a notification message, wherein the received report includes recorded vibrations of a gas pressure regulator. The processor is configured to identify a pattern in the vibrations within the received report based on at least one of frequency or magnitude of the vibrations. The processor is also configured to analyze the recorded vibrations to detect a change in the identified pattern. The processor is further configured to generate a notification message indicating an operational status of the gas pressure regulator based on whether a change in the vibration pattern is identified In a third embodiment, a method detecting vibrations of a gas pressure regulator. The method also includes recording the detected vibrations caused by the gas pressure regulator at a predetermined time intervals. The method further includes purging a report of the recorded vibrations caused by the gas pressure regulator to indicate the operational status of the gas pressure regulator, wherein the generated report includes at least two recorded vibrations. The method also includes transmitting the generated report Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
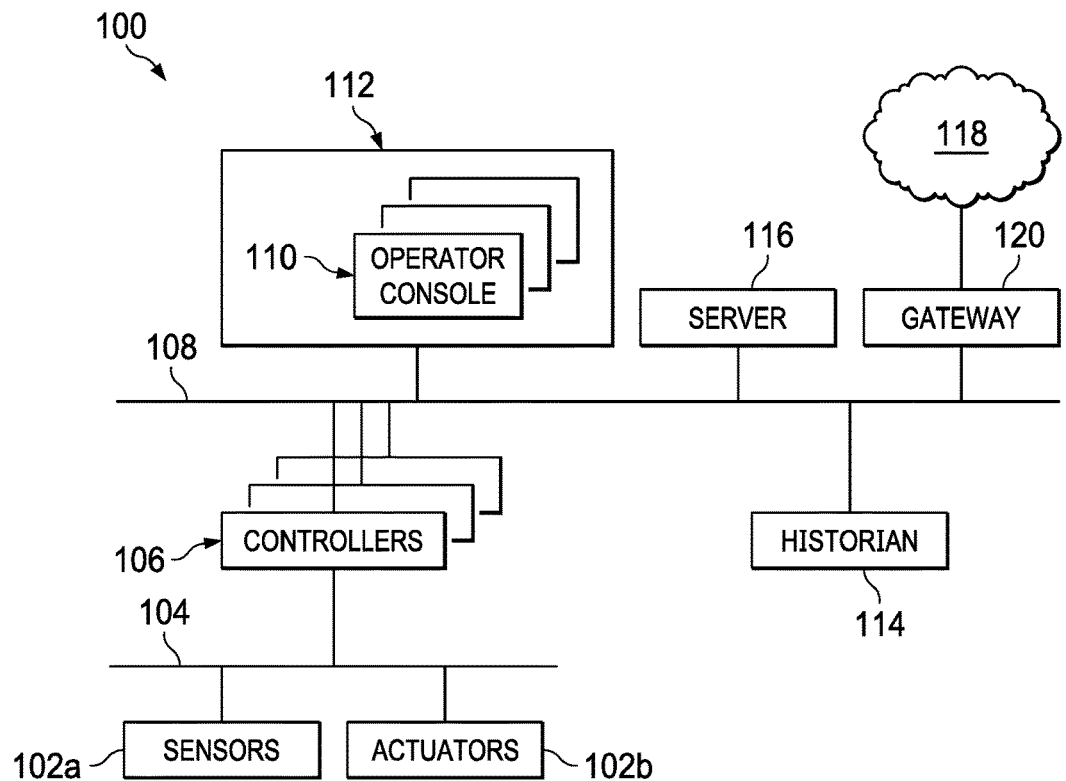
FIG. 1 illustrates an example industrial process control and automation system according to this disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Gas pressure regulators (also known as gas regulators, pressure control valves, pressure regulating valves) regulate the pressure in a pressurized gas system. A gas regulator allows pressurized gas to flow into an orifice, and when the gas exits the valve, the gas pressure is reduced or stabilized or both. Generally, a flexible diaphragm is attached to a disk by a mechanical linkage. The diaphragm covers an internal chamber such that one side of the diaphragm is exposed to atmospheric pressure and the other side of the diaphragm is exposed to the gas. The pressurized gas flows through an inlet orifice that can be opened and closed by the disk and the linkage, which are attached to the diaphragm. The diaphragm is also attached to a spring and a calibration screw. The screw can compress the spring in order to change the steady state force on the diaphragm to adjust the regulated pressure set point. The diaphragm moves in response to the balance between pressure inside the regulator and the spring. For example, when the pressure exceeds the regulated set point (such as when the pressure is too high) the diaphragm and the linkage move the disk to close the orifice. When the pressure drops below the regulated set point (such as when the pressure is too low) the disk is moved to open the orifice to allow more gas pressure and flow into the regulator. That is, the diaphragm moves in response to the balance between the pressure inside the regulator and the adjustment spring force. Additionally, gas pressure regulators can include an internal pressure relieve valve to open when the regulated gas pressure rises above a safe operation pressure.

Typically gas pressure regulators are purely mechanical devices that regulate gas pressure. Certain gas pressure regulators are electro-mechanical, pneumatic, or electro-pneumatic that operates a gas pressure regulator under a process change condition. For example, an electro-mechanical gas pressure regulator regulates and controls pressure of the gas at the outlet. Controlling pressure can be achieved by a predetermined remote set-point adjustment and establishing automatic load limiting states. In another example, an electrical sensor can be added to a gas pressure regulator that can notify an operator when the device fails. However, in an industrial process environment, when a gas pressure regulator fails, the process can be forced to shut down. Various industrial process environments often utilize a redundancy system such that when the active pressure regulator valve fails, a backup is already in the system to regulate the gas pressure eliminating any down time.

Generally, gas pressure regulators vibrate as the devices exhibit unstable tendencies. For example, gas pressure regulators often vibrate, or hum while in use. In certain embodiments, the vibrations increase based on the flow rate, pressure, temperature as well as the physical parameters of the gas pressure regulator. Physical parameters can include the volume of the various compartments within the gas pressure regulator as well as the size of the inlet and outlet piping. The frequency of the vibrations or humming of a gas pressure regulator can provide an indication as to the longevity of the gas pressure regulator. For example, if the frequency of the vibrations remains steady then the gas pressure regulator is not in risk of failing. In contrast, if the frequencies of the vibrations are not steady or the magnitude of the frequency changes then the pressure regulator could be in risk of failing. Many factors affect the frequency of vibrations such as the flow rate of the gas, the pressure and temperature of the gas as it flows through the gas pressure regulator. In certain embodiments, the frequency of a gas pressure regulator is less than 133 Hz.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, flow rate, or a voltage transmitted through a cable. Also, the actuators 102b could alter a wide variety of characteristics in the process system, such as valve openings. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system. In certain embodiments, sensors 102a and actuator 102b are connected to network 104. Network 104 generally represents any suitable communication network(s). In certain embodiments, network 104 is an internal network that provides feedback of the sensor 102a and actuator 102b to owners/operators of the system 100. For example, sensor 102a can include an indicator that indicates the performance of the specific sensor or reports the measured parameters to the owners/operators of the system 100. In certain embodiments, network 104 is an external network, outside the control of owners/operators of the system 100, but provides feedback of the sensor 102a and actuator 102b to a third party network. For example, sensor 102a can include an indicator that indicates the performance of the specific sensor or reports the measured parameters to a third party system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. For example, a controller 106 could receive measurement data from one or more sensors 102a and use the measurement data to generate control signals for one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

At least one networks 108 couples to the controllers 106 and other devices in the system 100. The network 108 facilitates the transport of information between components. The networks 108 could represent any suitable networks or combination of networks. As particular examples, the networks 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving set points or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. The servers can be locally or located remotely from the control and automation system 100. For instance, the functionality of a server could be implemented in a computing cloud or a remote server communicatively coupled to the control and automation system 100 via a gateway such as gateway 120. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

In accordance with this disclosure, one or more other process variable measurements can be correlated with the pressure of material through the structure, and the other process variable measurements can be used to verify whether the gas pressure regulators or other components are operating correctly. For example, a controller 106, operator console 110, server 116, or computing cloud 118 could use one or more models associating the pressure, temperature of flow of the material through the structure with one or more other process variables. Measurements associated with the one or more other process variables can be obtained and used to verify the operational status of the gas pressure regulators.

The sensors 102a in FIG. 1 include at least one gas pressure regulator that reduces the gas pressure for the industrial process. As noted above, the failure of a gas pressure regulator can cause various problems, such as disruptions in an industrial process, safety issues, or environmental damage.

Generally, various sensors 102a and actuators 102b, such as a certain gas pressure regulators, are traditionally not connected to network 104 due to their remote location within the system 100. As a result, signs that can indicate an operational decline of a gas pressure regulator can go undetected when the device is not connected to network 104. Embodiments of the present disclosure provide network access to remote sensors 102a and actuators 102b that are traditionally not connected to network 104 by generating electrical energy to power sensors, actuators and a communication interface. Additionally, embodiments of the present disclosure provide methods to derive the operational status of a gas pressure regulator based on variations of the innate vibrations associated with the valve as well as changes in the pressure, temperature, or flow upstream and downstream of the gas pressure regulator.

In certain embodiments, the vibrations associated with the gas pressure regulator provide an indication as to the functioning of the gas pressure regulator. In certain embodiments, temperature, pressure, flow rate, or a combination thereof, of the gas immediately upstream and downstream of the gas pressure regulator can also provide an indication as to the functioning of the gas pressure regulator.

In certain embodiments, the gas pressure regulator is similar to the actuator 102b and affixed to an energy generator. The energy generator converts mechanical vibrations of the gas pressure regulator to electrical energy to power one or more sensors and a communication interface. The communication interface transmits readings from the one or more sensors via network 108 to a controller 106 or an end user device. The transmitted readings provide an indication as to operational status of the gas pressure regulator or other sensors.

In certain embodiments, network 108 is a wireless network that connects the gas pressure regulator to one or more controllers 106, or a user device. For example, the communication interface associated with the gas pressure regulator is connected to a third party network outside the control of owners/operators of the system 100. That is, the third party network provides feedback of the sensor 102a and actuator 102b to a third party server that can provide an indication of the performance of the specific sensor or actuators (such as sensors 102a and actuators 102b) as well as generate reports as to the functioning of the sensor or actuators of system 100.

In certain embodiments, server 116 can correlate changes in the vibrations to additional data such as temperature, pressure, flow rate, or a combination thereof, of the gas entering and exiting the gas pressure regulator. Server 116 can identify whether the change in vibrations of the gas pressure regulator is due to a change in one or more temperature, pressure, or flow rate of the gas or whether the gas pressure regulator is failing. Thereafter, the server 116 can transmit a message to the proper operation station, user device or the like to notify that the gas pressure regulator is failing.

The widespread use of mobile "smart" devices (such as APPLE IPHONEs and IPADs and ANDROID devices) allows users to remain connected to and to interact with remote computing devices from virtually anywhere each user travels. Among other things, this could allow personnel associated with an industrial process control and automation system, such as system 100, to receive warnings, alerts, or other notifications associated with events and other information and trigger actions associated with the control and automation system, regardless of whether the personnel are physically located at an industrial site. For example, events that are generated in a process control and automation system are often presented to operators currently on shift in one or more control rooms. There may also typically be a need or desire to inform users outside of control rooms, outside of an industrial plant, or while off network of events that are happening in the control and automation system. These events can come from a variety of applications, such as from a distributed control system (DCS) itself, advanced process control applications, operations applications, or business applications. Delivery of notifications describing these events to a user's handheld mobile device enables the user to receive notifications virtually anywhere and at any time. For example, users can receive notifications as to the operational status of sensor 102a or actuator 102b in the event that sensor 102a or actuator 102b fails or starts to exhibit an indication of failing. This allows personnel to maintain situational awareness with respect to the control and automation system even when the personnel are outside of a control room or other typical work location.

In certain embodiments, the system 100 may optionally include one or more mobile devices (not shown), such as a mobile "smart" device. Each mobile device could be used to obtain information about one or more industrial processes or the system 100 and display the information to users. Each mobile device could also be used to obtain input from the users altering how the industrial processes are controlled by the system 100. A mobile device could be used in any other suitable manner in or with the system 100. Any suitable type(s) of mobile devices could be used in or with the system 100, such as smartphones, tablet computers, or laptop computers.

Although FIG. 1 illustrates one example of an industrial process control and automation system 100, various changes may be made to FIG. 1. For example, a control and automation system 100 could include any number of sensors, actuators, controllers, servers, operator stations, operator consoles, control rooms, historians, networks, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where at least one gas pressure regulator can be monitored. This functionality can be used in any other suitable system, and that system need not be used for industrial process control and automation.

Industrial processes are typically implemented using large numbers of devices, such as pumps, valves, compressors, or other industrial equipment. Similarly, industrial process control and automation systems are typically implemented using large numbers of devices, such as the sensors 102a, actuators 102b, controllers 106, and other components in FIG. 1. Various networks can be used to couple these devices together and transport information.

Figure 2:
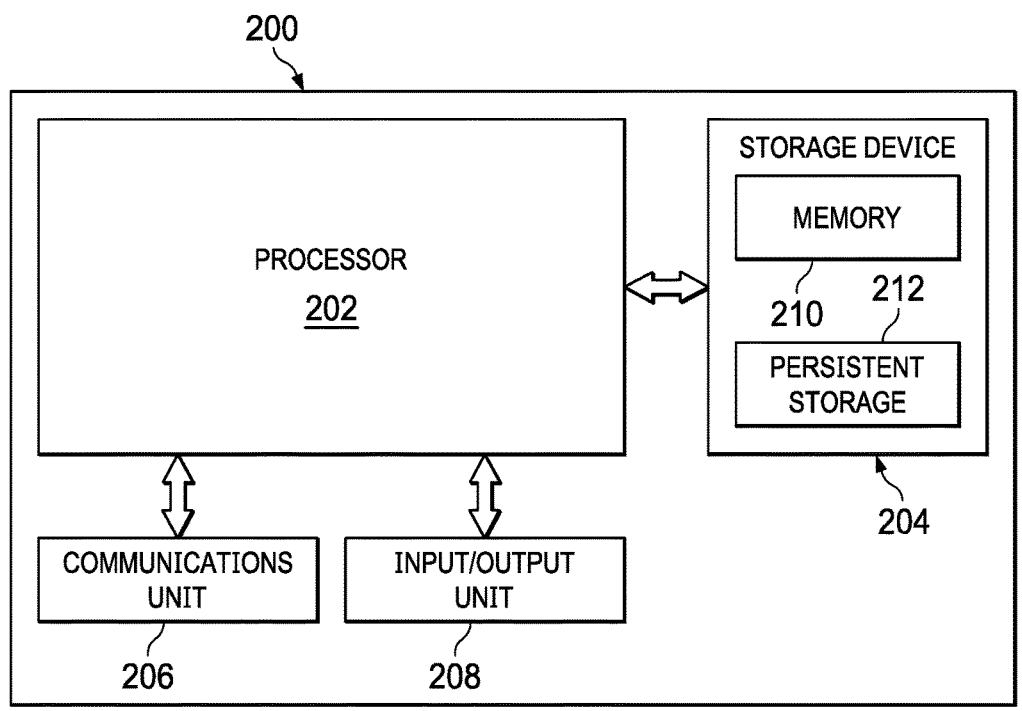
FIG. 2 illustrates example devices for user processing the operational status of devices according to this disclosure.

FIG. 2 illustrates example devices for user processing the operational status of devices according to this disclosure. In particular, FIG. 2 illustrates an example computing device 200. In some embodiments, the computing device 200 could denote an operator console, server, a remote server or device, or a mobile device. The computing device 200 could be used to run applications. The computing device 200 could be used to perform one or more functions, such as monitoring vibrations of a gas pressure regulator, generating and transmitting a notification based on the operational status of a gas pressure regulator, or recording and transmitting the vibrations associated with a gas pressure regulator. For ease of explanation, the computing device 200 is described as being used in the system 100 of FIG. 1, although the device could be used in any other suitable system (whether or not related to industrial process control and automation).

As shown in FIG. 2, the computing device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) configured to store and facilitate retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read-only memory, hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touch screen, or other suitable input device. The I/O unit 208 may also send output to a display, printer, or other suitable output device.

Figure 3:
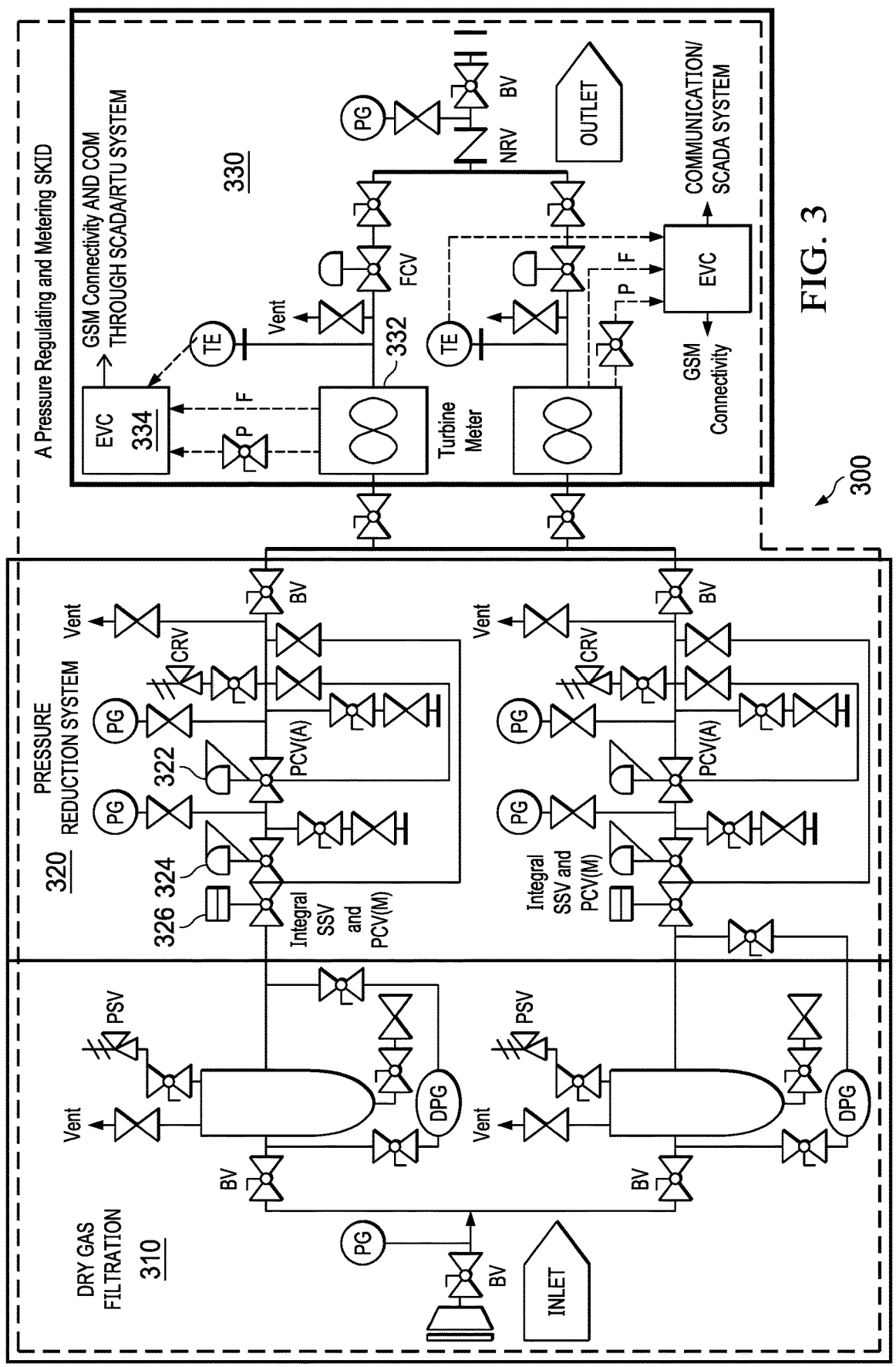
FIG. 3 illustrates an example gas regulating system according to this disclosure.

FIG. 3 illustrates an example gas regulating system 300 according to this disclosure. The embodiment of the gas regulating system 300 shown in FIG. 3 is for illustration only. Other embodiments can be used without departing from the scope of the present disclosure. The gas regulating system 300 illustrates a general purpose module skid mounted gas sub-system that is capable of integration with various scalable control systems includes advanced meter data management to manage a plants gas supply.

The gas regulating system 300 includes an inlet, a dry gas filtration system 310, a pressure reduction system 320, a pressure regulating and metering skid 330, and an output.

The dry gas filtration system 310 system filters the incoming gas prior to entering the industrial process, such as the industrial process control and automation system 100 of FIG. 1.

The gas exits the dry gas filtration system 310 and enters the pressure reduction system 320. Generally, the pressure reduction system 320 is not connected to the industrial process control and automation system 100 as the pressure reduction system 320 is often located remotely from the industrial process. The pressure reduction system 320 reduces the high pressure from the input to a pressure suitable for the industrial process following the output. The suitable pressure can be preset or dynamically controlled via one or more controllers similar to controller 106 of FIG. 1. Pressure control valve (A) 322 and pressure control valve (B) 324 are gas pressure regulators as discussed above. The pressure control valve (A) 322 is the acting pressure control valve, while the pressure control valve (B) 324 is the backup gas pressure regulator. Pressure control valve (B) 324 is activated only if the pressure control valve (A) 322 fails. That is, the pressure control valve (B) 324 acts as a redundant gas pressure regulator to pressure control valve (A) 322. For example, the various instruments and individuals who oversee the industrial process control and automation system 100, could be unaware of when or if the pressure control valve (A) 322 fails and the pressure control valve (B) 324 starts to regulate the gas pressure. If both the pressure control valve (A) 322 and the pressure control valve (B) 324 fail, the slam shut valve 326 activates and shuts off the gas supply downstream. The slam shut valve 326 is a precautionary valve but can cause delays in the industrial process associated with the industrial process control and automation system 100. Therefore it is desirable to have the ability to remotely monitor the pressure control valve (A) 322 or the pressure control valve (B) 324, or both.

The gas exits the pressure reduction system 320 and enters the pressure regulating and metering skid 330. The pressure regulating and metering skid 330 is capable of being connected to the industrial process control and automation system 100. For example, the pressure regulating and metering skid 330 is generally located closer to the industrial process control and automation system 100, providing easier access to electricity and connectivity means. The turbine meter 332 is a flow meter that measures the incoming flow of gas from the pressure reduction system. The turbine meter 332 can transmit the temperature, pressure, and flow rate to the electronic volume corrector (EVC) 334. The EVC 334 transmits the temperature, pressure, and flow rate to the industrial process control and automation system 100. In certain embodiments, the pressure regulating and metering skid 330 is connected with smart capabilities, allowing the industrial process control and automation system 100 to identify if a portion of the previous gas system is currently failing. If a portion of the dry gas filtration system 310 or the pressure reduction system 320 does fail, it is generally too late to perform any preventative actions to mitigate any damage downstream. Therefore, embodiments of the present disclosure provide the ability to monitor the status of components such as sensors and actuators of a gas regulating system 300 where currently no electricity or networking capability currently exists, as well as monitoring the operational status of a gas pressure regulating valve.

As discussed above, embodiments of the present disclosure provide for a gas pressure regulator that is capable of harvesting energy absent an electrical grid and able to record as well as transmit reports at predetermined time intervals to indicate the status of various components, sensors and actuators of the gas regulating system 300.

Figure 4:
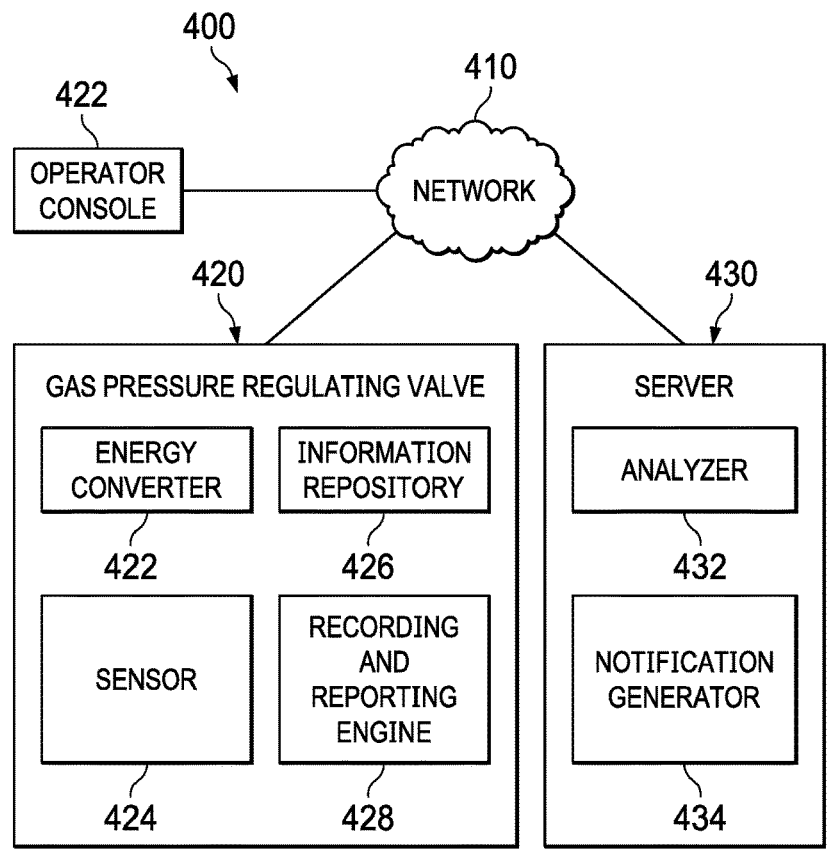
FIG. 4 illustrates an example block diagram according to this disclosure.

FIG. 4 illustrates an example block diagram 400 according to this disclosure. FIG. 4 illustrates a high-level architecture, in accordance with an embodiment of this disclosure. The embodiment of the block diagram 400 shown in FIG. 4 is for illustration only. Other embodiments can be used without departing from the scope of the present disclosure. Block diagram 400 includes a gas pressure regulating valve 420, a server 430, and an operator console 440 are interconnected and capable of communicating via network 410.

In certain embodiments, network 410 includes a larger networking environment. For example, network 410 can be used for communication between the gas pressure regulating valve 420 and the server 430 as well as communication between the server 430 and the operator console 440. In another example, network 410 can be used for communication between the gas pressure regulating valve 420 and the operator console 440. Network 410 also is able to provide communication medium between the pressure regulating valve and additional servers and equipment (not shown). For example, network 410 can be connected to an information repository (i.e., a database) that contains historical data pertaining to the gas pressure regulating valve 420 or additional sensors associated with the gas pressure regulating valve 420.

In certain embodiments, network 410 represents a "cloud" of computers interconnected by one or more networks, where network 410 is a computing system utilizing clustered computers and components to act as a single pool of seamless resources when accessed. In certain embodiments, network 410 represents a wireless network that can range is sized from Near Field Communication (NFC) to Local Area Networks (LANs) to wide area networks (WAN). In certain embodiments, network 410 provides access to the internet or other remote networks.

As discussed above, the gas pressure regulating valve 420 regulates the pressure in a high pressure gas system. The gas pressure regulating valve 420 allows high pressure gas to flow into an orifice, and when the gas exits the valve, the gas pressure is reduced or stabilized or both. The gas pressure regulating valve 420 includes an energy converter 422, a sensor 424, an information repository 426, and a recording and reporting engine 428.

Since gas pressure regulators vibrate often exhibit unstable tendencies, the gas pressure regulating valve 420 includes both an energy converter 422 to generate and harvest energy from the vibrations of the gas pressure regulating valve 420 and a sensor 424 to monitor and capture the vibrations of the gas pressure regulating valve 420. As a result, the same vibrations that indicate the status or longevity of the gas pressure regulating valve 420 also provide the power to perform periodic recordings of periodic transitions of the recoded vibrations.

Energy converter 422 captures energy from an external source and stores the captured energy for later use by the gas pressure regulating valve 420. Generally, energy harvesting provides a very small amount of power for low-energy electronics. Energy converter 422 captures mechanical vibrations and converts the vibrations to usable electrical energy to charge a battery, a capacitor, or directly power sensor 424, a processor (similar to processor 202 of FIG. 2), or a communications unit (similar to communications unit 206 of FIG. 2). In certain embodiments, energy converter 422 is an electromechanical generator for harvesting useful electrical power from ambient vibrations. For example, the energy converter 422 can be a magnetic inductor and can include a magnet-coil generator that includes a spring-mass combination attached to a magnet or coil such that when the system vibrates, a coil cuts through the flux formed by a magnetic core. In another example, the energy converter 422 can include piezoelectric crystals or fibers that are used to generate a small voltage whenever the crystals or fibers are mechanically deformed, such as by vibration. Alternative embodiments are possible by those skilled in the art.

Sensor 424 can include one or more sensors that can meter a physical quantity and convert metered or detected information into an electrical signal. In certain embodiments, sensor 424 is an inertial sensor (such as, an accelerometer, a gyroscope, or a magnetometer) that is capable of detecting and capturing vibrations of the gas pressure regulating valve 420. Sensor 424 is capable of detecting the frequency of the vibrations, the magnitude of the vibrations, and the like. In certain embodiments, sensor 424 is capable of detecting velocity, displacement and proximity, or acceleration of the gas pressure regulating valve 420. For example, a displacement sensor or proximity sensors measure motions, internal clearance, and vibrations relative to other support structures. Generally, displacement or proximity sensors are used in low-frequency (1 to 100 Hz) measurement and measure low-amplitude displacement. In another example, velocity sensors are used for low to medium frequency measurements (1 to 1000 Hz) and are useful for vibration monitoring. Generally, velocity sensors have lower sensitivity to high frequency vibrations than accelerometers. In another example, an accelerometer measure low to very high frequencies. For instance a piezoelectric accelerometer is often can detect large for frequency and amplitude ranges. The sensor 424 can further include a control circuit for controlling at least one of the sensors included therein.

Information repository 426 can be implemented using any architecture known in the art such as, for example, a relational database, an object-oriented database, or one or more tables, or a combination thereof. Information repository 426 stores data captured by the sensor 424. For example, the information repository 426 stores the frequency or amplitude or both of the vibrations associated with the gas pressure regulating valve 420. In certain embodiments, additional sensors draw power from the energy converter 422 and the store their meted data in the information repository 426. For example, pressure sensors, temperature sensors, flow sensors and the like can store information in the information repository 426. In certain embodiments, the information repository 426 overwrites the recorded data at predetermined periods. For example, the recording and reporting engine 428 can instruct the information repository 426 to overwrite previous data after the successful transmission of the recorded data to the server 430 or the operator console 440 (or after a certain number of successful transmissions). In another example, the information repository 426 can maintain the data for a predetermined period of time. In certain embodiments, the information repository 426 is external to the gas pressure regulating valve 420.

The recording and reporting engine 428 monitors and controls the recording and reporting of the vibrations sensed via sensor 424. In certain embodiments, the recording and reporting engine 428 instructs the sensor 424 to capture and record vibrations of the gas pressure regulating valve 420 at predetermined intervals. The recordation's can occur multiple times a day to several times a week, and anywhere in-between. In certain embodiments, the recording and reporting engine 428 can instruct various auxiliary sensors to also record sensed data into the information repository at predestined time intervals. The various auxiliary sensors can include a temperature sensor, a pressure sensor, a flow sensors and the like. In certain embodiments, the recording and reporting engine 428 transmits the recorded data from the information repository 426 to the server 430, the operator console 440 or both via network 410 at predetermined time intervals. It is noted that each predetermined time intervals can be the same or different. For example, the recording and reporting engine 428 can instruct the sensor to record data at predetermined intervals and transmit the data after a certain number of recordings. By transmitting the data after a certain number of recordings reduces the number of transmissions and can transmit a larger payload in each transmission. In certain embodiments, the recording and reporting engine 428 monitors the power level of the energy converted or harvested by the energy converter 422.

The server 430 is a remote server that receives and analyzes the data transmitted from the gas pressure regulating valve 420. The server 430 may include internal and external components as previously depicted and described in further detail with respect to FIG. 2. In certain embodiments, the server 430 represents a "cloud" of computers interconnected by one or more networks (such as network 410), where server 430 is a computing system utilizing clustered computers and components to act as a single pool of seamless resources when accessed. Server 430 includes analyzer 432 and notification generator 434.

The analyzer 432 analyzes the received vibrations of the gas pressure regulating valve 420. The analyzer 432 detects changes in the vibration patterns such as if the frequency changes as well as changes in the amplitudes of the vibrations. In certain embodiments, the analyzer 432 derives a baseline vibration associated with the gas pressure regulating valve 420. A baseline vibration is the general frequency, or amplitude or both of the vibrations associated with the gas pressure regulating valve 420. In certain embodiments, the analyzer 432 determines whether a deviation from the baseline occurs. The analyzer 432 can then identify the cause of the deviation. For example, the deviation can be caused by temperature, pressure, or flow rate changes of the gas. In another example, the deviation can be caused by the gas pressure regulating valve 420 starting to fail. In another example, the deviation can be caused by the gas pressure regulating valve 420 having already failed. If it is determined that the deviation of the vibrations is due to normal expected changes to the system, then the analyzer 432 determines that the gas pressure regulating valve 420 is functioning properly. If it is determined that the deviation of the vibrations is due to the gas pressure regulating valve starting to fail, then the notification generator 434 generates and transmits a notification to an indicated end-user device or an operator console, such as operator console 440, instructing an individual plant operator to perform a remedying action. In certain embodiments, the remedying action can include replacing or repairing the faulty gas pressure regulating valve 420.

The operator console 440 is similar to any operator console, such as operator console 110 of FIG. 1, or controller, such as controller 106 of FIG. 1, or any combination thereof. In certain embodiments, the server 430 and the operator console 440 are the same. For example, the gas pressure regulating valve 420 transmits the data to operator console 440, where the operator console 440 includes the analyzer 432 that analyzes the received vibrations. The operator console 440 provides a notification to an individual indicating the failure or potential failure of the gas pressure regulating valve 420.

Figure 5:
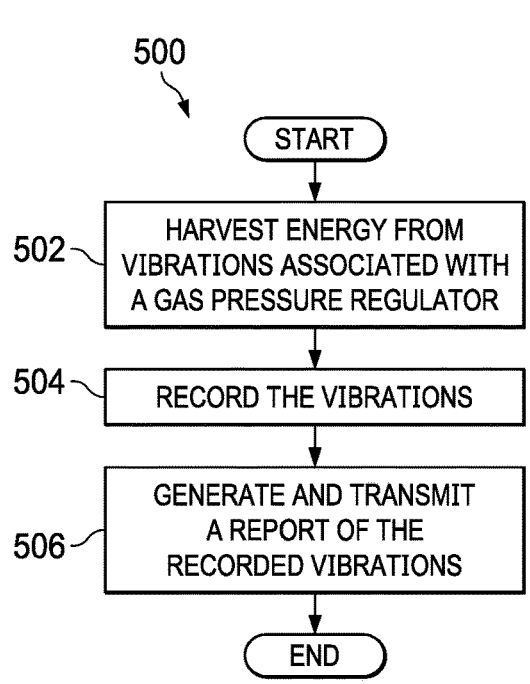
FIG. 5 is an example method for generating and transmitting a report of recorded vibrations associated with a gas pressure regulator according to this disclosure.

FIG. 5 is an example method 500 for generating and transmitting a report of recorded vibrations associated with a gas pressure regulator according to this disclosure. The steps in FIG. 5 can be performed by gas pressure regulating valve 420, in particular the recording and reporting engine 428, as shown in FIG. 4.

As shown in FIG. 5, the gas pressure regulating valve 420 generates energy from vibrations associated with the gas pressure regulator at step 502. This could include, for example, a device that captures mechanical vibrations and converts the vibrations to usable electrical energy to change a battery, a capacity or directly power one or more electrical devices.

At step 504, the gas pressure regulating valve 420 detects vibrations by a sensor and records the vibrations in an information repository. For example, the gas pressure regulating valve 420 utilizes a sensor to detect vibrations, which are the same vibrations that the gas pressure regulating valve 420 uses to generate energy. The recorded vibrations can include the frequency of the vibrations. The recorded vibrations can include the amplitude of the vibrations. In certain embodiments, the vibrations are recorded at a predetermined time interval. In certain embodiments, the temperature, pressure, or flow rate of the gas is also recorded. In certain embodiments, the recording and reporting engine 428 can also analyze the recorded vibrations and transmit a notification at a non-predetermined time interval if it is identified that the vibrations indicate that the gas pressure regulator is failing.

At step 506, the gas pressure regulating valve 420 generates and transmits a report of the vibrations to server 430 for analysis. In certain embodiments, the report is transmitted at a predetermined time interval. In certain embodiments, the predetermined time interval of recording the vibrations and the predetermined time interval of generating and transmitting the report are different. For example, an operator of the plant can request that the vibrations be recorded multiple times a day, and the report is generated and transmitted only once a day. In certain embodiments, if no vibrations are detected, then a report is generated and transmitted indicating that the gas pressure regulator has failed. In certain embodiments, the generated report is transmitted when the energy converter 422 generates a predetermined quantity of energy. In certain embodiments, a report is generated and transmitted when no vibrations are detected.

Figure 6:
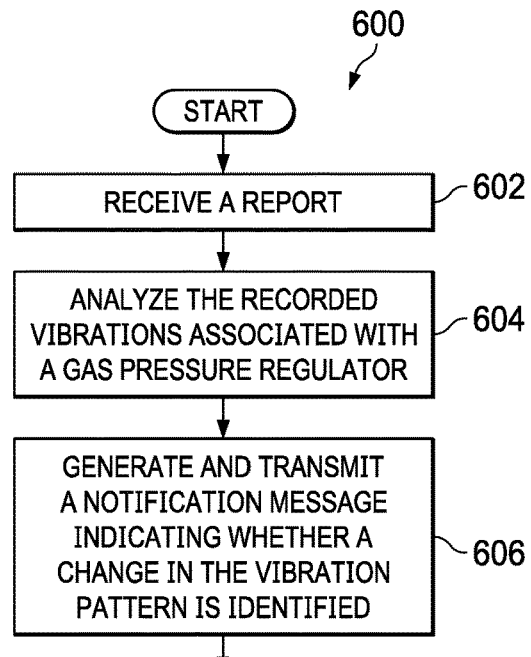
FIG. 6 is an example method for analyzing the vibrations associated with a gas pressure regulator according to this disclosure.

FIG. 6 is an example method 600 for analyzing the vibrations associated with a gas pressure regulator according to this disclosure. The steps in FIG. 6 can be performed by server 430 or the operator console 440 as shown in FIG. 4. The steps in FIG. 6 can be performed by server 116 as shown in FIG. 1.

As shown in FIG. 6, server 430 receives a report that includes the vibrations of the gas pressure regulator in step 602. This can include the vibration amplitude, the vibration frequency, as well as various metered parameters of the gas pressure system such as pressure, temperature and flow of the gas.

At step 604, the server 430 analyzes the received report to detect a change in the vibration patterns in order to determine the status of the gas pressure regulator. For example, if a change in the vibrations is detected, the server determines whether the change is based on a physical change of the gas pressure regulator (such as the device is failing) or the change is caused by changes in the gas flowing through the gas pressure regulator. In certain embodiments, the serve can generate a baseline vibration of the gas pressure regulator and any deviation from the baseline the server identifies whether the gas pressure regulator is failing. For example, a change in vibrations can be caused by external factors to the gas pressure regulator such as changes in the pressure upstream of the gas pressure regulator. In another example, change in vibrations can be caused by external factors to the gas pressure regulator such as changes in the temperature upstream or downstream of the gas pressure regulator.

At step 606 the server 430 generates and transmits a notification indicating the operational status of the gas pressure regulator. In certain embodiments, the message is generated to indicate a change in the vibration patterns. In certain embodiments, the server generates a second message that indicates that the pressure regulating valve is failing. In certain embodiments, a message is transmitted only when the server determines that the server is failing in step 604. In certain embodiments, a message is generated indicating that the gas pressure regulator is functioning correctly. In certain embodiments, the generated notification also includes the received temperature, pressure or flow of the gas, or a combination thereof.

Although FIG. 5 and FIG. 6 illustrate single examples of a method 500 and 600, respectively, for recording and analyzing vibrations associated with a gas pressure regulator related to an industrial process control and automation system, various changes may be made to FIG. 5 and FIG. 6. For example, while each figure shows a series of steps, various steps in each figure could overlap, occur in parallel, occur in a different order, or occur any number of times. Also, each method could include any number of events, event information retrievals, and notifications.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An electronic device operably coupled to a gas pressure regulator, the electronic device comprising:
   a sensor configured to detect vibrations including a frequency of the vibrations of the gas pressure regulator;
   a memory configured to store the detected vibrations;
   a processor operably coupled to the sensor and the memory, wherein the processor is configured to:
      record the detected vibrations including the frequency of the vibrations caused by the gas pressure regulator at a predetermined time interval so that the recorded vibrations are obtained from two or more different times,
      analyze the recorded vibrations including the frequency of the vibrations to detect a change, and
      generate a report of the recorded vibrations caused by the gas pressure regulator to indicate an operational status of the gas pressure regulator;
   a communication interface configured to transmit the generated report; and
   an energy converter configured to convert energy vibrations of the gas pressure regulator to electrical energy to provide power to the sensor, the memory, the processor and the communication interface.

2. The electronic device of claim 1, wherein the frequency of the vibrations is in the form of a frequency range wherein the analyzing to indicate the operational status of the gas pressure regulator identifies at least one component of the gas pressure regulator that needs to be repaired, and wherein the component of the pressure regulator that needs to be repaired is also identified in the generated report.

3. The electronic device of claim 1, wherein
   the predetermined time interval is a first predetermined time interval;
   the communication interface is further configured to transmit the generated report at a second predetermined time interval; and
   the first predetermined time interval occurs more frequently than the second predetermined time interval.

4. The electronic device of claim 1, wherein:
   the processor is further configured to generate a second report when the sensor detects no vibrations; and
   the communication interface is further configured to transmit the second report.

5. The electronic device of claim 1, further comprising a temperature sensor configured to detect temperature of gas within proximity to the gas pressure regulator, and
   wherein the processor is operably coupled to the temperature sensor and further configured to:
      record the detected temperature of the gas, and
      generate the report of the recorded temperature of the gas.

6. The electronic device of claim 1, further comprising a pressure sensor configured to detect pressure of gas within proximity to the gas pressure regulator, and
   wherein the processor is operably coupled to the pressure sensor and configured to:
      record the detected pressure of the gas, and
      generate the report of the recorded pressure of the gas.

7. The electronic device of claim 1, further comprising a flow sensor configured to detect flow of gas within proximity to the gas pressure regulator, and
   wherein the processor is operably coupled to the flow sensor and configured to:
      record the detected flow of the gas, and
      generate the report of the recorded flow of the gas.

8. An electronic device comprising:
   a communication interface configured to receive a report and transmit a notification message, wherein the received report includes recorded vibrations obtained from two or more different times and including a frequency of the vibrations of a gas pressure regulator;
   a processor operably coupled to the communication interface, wherein the processor is configured to:
      identify a pattern in the vibrations within the received report based on the frequency of the vibrations;
      analyze the recorded vibrations including the frequency of the vibrations to detect a change in the identified pattern, and
      generate a notification message indicating an operational status of the gas pressure regulator based on whether a change in the vibration pattern is identified;
   an energy converter configured to convert energy vibrations of the gas pressure regulator to electrical energy to provide power to, the processor and the communication interface.

9. The electronic device of claim 8, wherein the processor is further configured to derive a baseline vibration pattern of the gas pressure regulator based on the recorded vibrations.

10. The electronic device of claim 9, wherein the processor is further configured to:
   determine whether a deviation of the baseline vibration pattern occurs; and
   identify whether the deviation occurred based on the gas pressure regulator begins to fail; and
   generate a second notification message when the operational status of the gas pressure regulator begins to fail.

11. The electronic device of claim 8, wherein the processor is further configured to determine whether the gas pressure regulator is functioning correctly based on the identified change of the vibration pattern.

12. The electronic device of claim 8, wherein the processor is further configured to identify that the gas pressure regulator is failing when a magnitude of vibrations increases.

13. The electronic device of claim 8, wherein:
   the received report further includes a property of gas associated with the gas pressure regulator, wherein the property is at least one of a temperature, a pressure or a flow of gas; and
   the processor is further configured to:
      correlate any detected changes to the property to the detected change in the identified pattern of the vibrations of the gas pressure regulator,
      determine whether the detected changes to the property caused the change in the identified pattern of the vibrations, generate a second notification message indicating a change in the property is identified, and the change did not affect the identified pattern of the vibrations of the gas pressure regulator, and generate a third notification message indicating change in the property is identified, and the change caused the change in the identified pattern of the vibrations of the gas pressure regulator.

14. A method comprising:

detecting vibrations including a frequency of the vibrations of a gas pressure regulator;

recording the detected vibrations including a frequency of the vibrations caused by the gas pressure regulator at a predetermined time interval so that the recorded vibrations are obtained from two or more different times;

analyzing the recorded vibrations including the frequency of the vibrations to detect a change;

generating a report of the recorded vibrations caused by the gas pressure regulator to indicate an operational status of the gas pressure regulator, wherein the generated report includes at least two recorded vibrations;

transmitting the generated report, and converting energy vibrations of the gas pressure regulator to electrical energy.

15. The method of claim 14, wherein the frequency of the vibrations is in the form of a frequency range wherein the analyzing to indicate the operational status of the gas pressure regulator identifies at least one component of the gas pressure regulator that needs to be repaired, and wherein the component of the pressure regulator that needs to be repaired is also identified in the generated report.

16. The method of claim 14, wherein:

the predetermined time interval is a first predetermined time interval;

the generated report is transmitted at a second predetermined time interval; and the first predetermined time interval occurs more frequently than the second predetermined time interval.

17. The method of claim 14, further comprising:

generating a second report when no vibrations are detected; and transmitting the second report.

18. The method of claim 14, recording a detected parameter of gas, wherein the parameter is at least one of a temperature, a pressure, or a flow; and transmitting a generated report of the recorded parameter.

* * * * *